Jan. 21, 1930.   L. J. MEYER   1,744,657
NUT CRACKING MACHINE
Filed Sept. 26, 1927   2 Sheets-Sheet 1
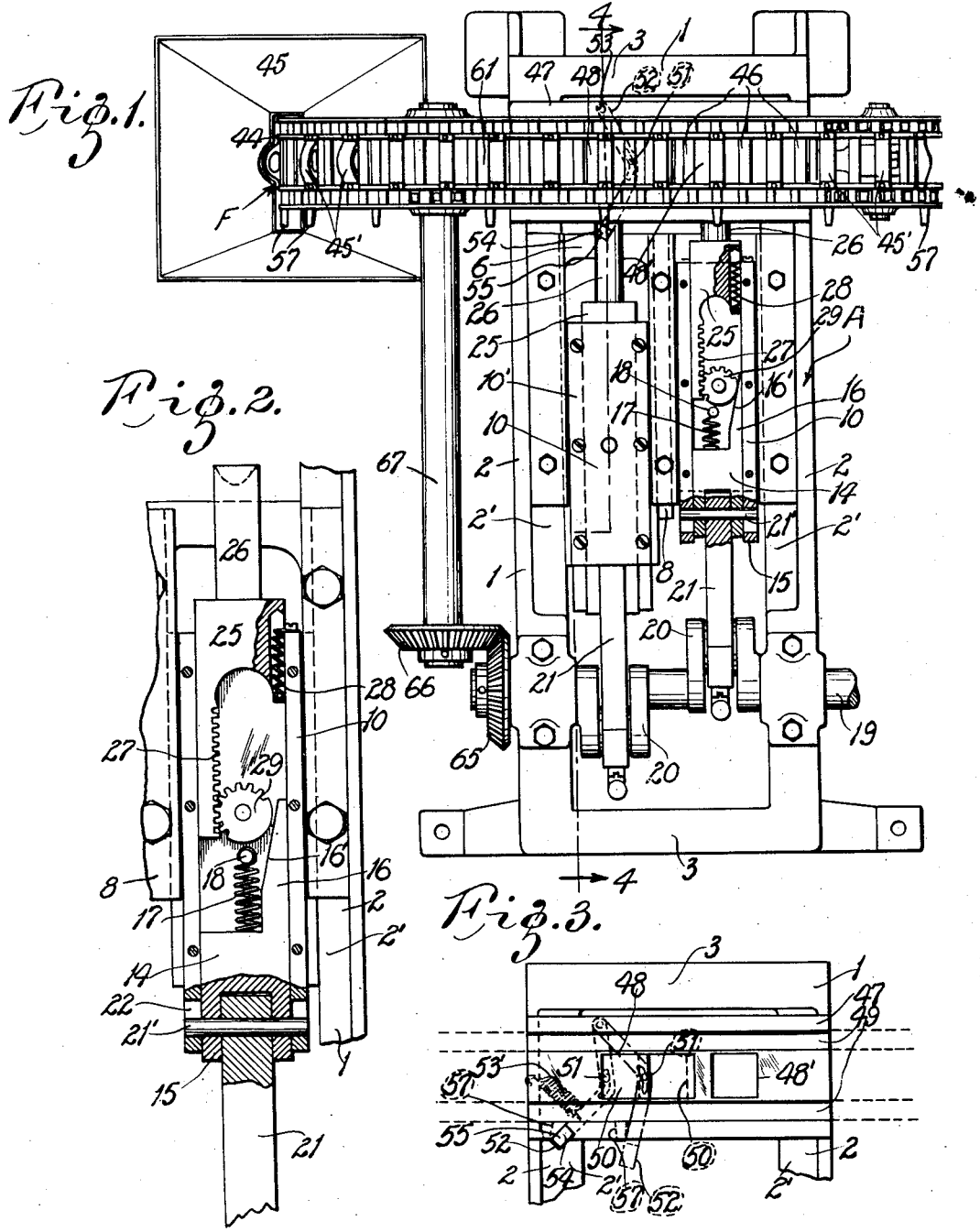
INVENTOR:
LEO. J. MEYER.
By Elliott Harrington
ATTORNEYS Jan. 21, 1930.   L. J. MEYER   1,744,657
NUT CRACKING MACHINE
Filed Sept. 26, 1927   2 Sheets-Sheet 2
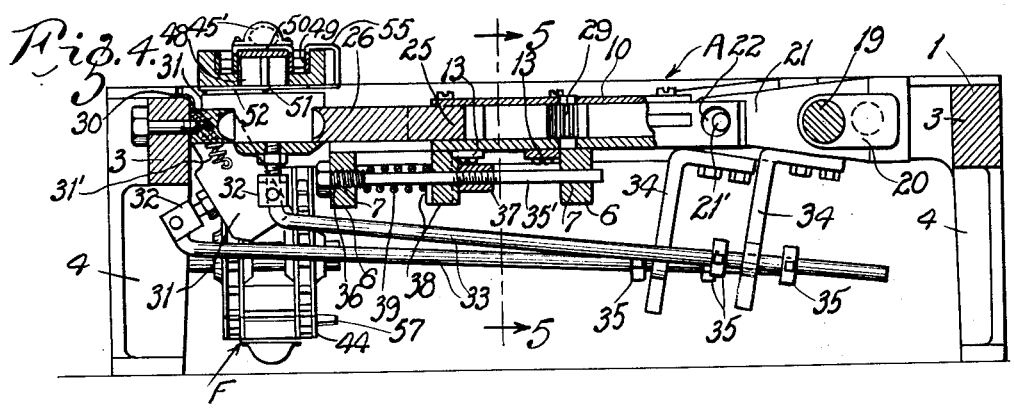
INVENTOR
LEO J. MEYER.
By Elliott Harrington
ATTORNEYS Patented Jan. 21, 1930

1,744,657

UNITED STATES PATENT OFFICE

LEO J. MEYER, OF ST. LOUIS, MISSOURI, ASSIGNOR OF ONE-HALF TO JOHN A. SCHULER, OF ST. LOUIS, MISSOURI

NUT-CRACKING MACHINE

Application filed September 26, 1927. Serial No. 221,980.

This invention relates, generally, to nut cracking machines, and particularly to an improved machine of this type which is much more simple than the machines formerly employed for this purpose, the predominant object of the present invention being to produce a machine for cracking edible nuts which, while relatively simple when compared with other machines of this type, will function in a highly efficient manner.

Another object of my invention is to provide a nut cracking machine with improved compensating mechanism whereby edible nuts of different dimensions may be acted upon by the cracking elements of the machine to properly crack the shells thereof.

Still another object of the invention is to provide a nut cracking machine with improved means for feeding nuts to be cracked to the machine.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Figure 1 is a plan view of my improved nut cracking machine;

Figure 2 is a fragmentary view partly in plan and partly in section showing the compensating mechanism of my improved machine;

Figure 3 is a fragmentary plan view illustrating the means for controlling the presentation of nuts to certain of the cracking elements of the machine;

Figure 4 is a longitudinal section through the machine;

Figure 5 is a section on line 5—5 of Fig. 4;

Figure 6 is an end elevation of the machine showing the nut feeding means thereof, the hopper for containing the nuts to be cracked being shown in section.

In the drawings, A designates my improved nut cracking machine, which comprises a rectangular bed frame 1 formed of parallel side members 2 and transverse end members 3 bolted or otherwise secured together. The rectangular bed frame 1 is supported upon suitable legs 4 whereby said bed frame is maintained in an elevated and substantially horizontal position. As shown clearly in Fig. 5, each of the side members 2 of the bed frame 1 is provided with a laterally extended portion 2' which extends longitudinally of the side member a portion of the length thereof, and each of said laterally extended portions 2' is recessed to provide a shoulder 5 which extends longitudinally of the laterally extended portion 2'. Extended transversely of the bed frame 1 is a pair of spaced apart bars 6, said bars being located at the opposite ends of the portions 2', and the bars 6 are secured at their opposite ends to the side members 2 or said bars may, if desired, be formed integral with said side members. The bars 6 are provided with enlarged portions through which openings 7 are formed, there being a pair of openings in each bar 6, and the openings in one bar being arranged in alinement with the openings in the associated bar. Extended from one of the bars 6 to the associated bar 6 at the approximate center of the bed frame 1 and in parallelism with the side members 2 thereof is a bar 8, the last mentioned bar being provided with shoulders 9 at its opposite sides which are in horizontal alinement with the shoulders 5 already referred to. The bar 8 may be secured to the bars 6 in any suitable manner, or said bar 8 may be formed integral with said bars 6 if desired.

10 designates a pair of carriages which are supported for reciprocatory motion on the bed frame 1, each of said carriages being provided with laterally extended ribs 11 at the opposite sides thereof, which ribs rest upon an associated pair of shoulders 5 and 9, whereby the carriages 10 may reciprocate longitudinally of the bed frame 1 (Fig. 5). The ribs 11 on the carriages 10 are confined between the shoulders 5 and 9 and the lower faces of the guide members 12, which are secured to the laterally extended portions 2' and to the bar 8 by means of suitable fastening devices. This arrangement provides guide-ways in which the ribs 11 on the carriages operate, whereby reciprocation of the carriages may be effected. The carriages 10 are each approximately U-shaped in cross-section, as shown clearly in Fig. 5, and each of said carriages has a plate 13 secured to its lower wall, which plate is for a purpose to be hereinafter set forth.

Located within each of the carriages, 10 at an end thereof is a connecting member 14, said connecting member being of such width that it fits closely between the side walls of the U-shaped carriage, and of such height that its top face is flush with the top edges of said side walls of the carriage. Each of the connecting members is provided with a bifurcated portion 15 at one of its ends and at its opposite end with an extension 16 having an inclined face 16'. Each of the connecting members 14 is connected to the associated carriage by means of an expansible coil spring 17, one end of this coil spring being fixed to the connecting member in any convenient manner, as, for instance, by being seated in a recess therein, and the other end of the spring being attached to a pin 18 extended upwardly from the bottom wall of the carriage.

19 designates the drive shaft of the nut cracking machine, said drive shraft being supported in suitable bearings mounted on the side members 2 of the bed frame 1, and said drive shaft being provided with a pair of cranks 20 which are preferably arranged at an angle of approximately 90° with respect to each other. 21 designates connecting arms which connect the cranks 20 of the drive shaft with the respective connecting members 14, one end of each of said connecting arms being attached to one of the cranks 20, as shown clearly in Fig. 1, and each connecting arm being attached at its opposite end to one of the connecting members by means of a pin 21' which is passed through apertures in the spaced apart legs of the bifurcated portion of the connecting member and through the end portion of the connecting arm which is located between said spaced apart legs of said bifurcated portion. The pins 21' connecting the connecting arms to the connecting members are of such length that said pins extend beyond the opposite sides of the associated connecting members, as shown in Fig. 2, and the extended end portions of each of said pins are extended into relatively large openings 22 formed in the opposite side walls of the associated carriage 10, as clearly illustrated in the view mentioned.

The coil springs 17 exert rearward pressure on the connecting members 14, so that the pins 21' are forced into contact with the rear portions of the walls of the relatively large openings 22, as shown in Fig. 2, and said coil springs act as flexible connectors between the carriage 10 and the associated connecting members 14, said carriages and connecting members moving as units except when movement of the carriages is arrested, at which time the connecting members move independently of the carriages, the springs at such times being compressed and the opposite end portions of the pins 21' moving through the enlarged openings 22 to permit said independent movement.

Located within each of the U-shaped carriages at the end thereof opposite to the end at which the connecting member 14 is located is a compensating member 25 provided with a nut cracking element 26 rigidly fixed thereto. Each of the compensating members 25 is provided with a rack 27 which extends parallel and in contact with a side wall of the associated carriage. Each of the compensating members is attached to the associated carriage by a coil spring 28, the opposite ends of which are secured to the carriage and to the compensating member, respectively, (Fig. 2). The coil springs 28, which are of the contractile type, connect the carriages and the associated compensating members together, and, therefore, in the absence of any obstruction to prevent it, each carriage and its compensating member will move as a unit. However, in the event of the movement of the compensating members being arrested, the coil springs will permit the carriages to move indepndently of said compensating members.

Associated with each compensating member 25 is a pinion 29 having teeth preferably on a portion only of its periphery. The pinions 29 are each mounted on a vertical pin carried by the bottom wall of the associated carriage 10, and the teeth of each pinion are arranged in mesh with the teeth of the rack of the associated compensating member. The pinions 29 are each so located on the associated carriage that they are in close proximity to the inclined face 16' of the associated connecting member 14, whereby movement of said said connecting member will cause said inclined face to move into contact with the smooth portion of the periphery of the pinion. Each of the carriages 10 is provided with a cover plate 10' which is secured by suitable fastening devices to the side walls thereof, whereby the mechanisms located within said carriages are concealed.

Fixed to an end member of the bed frame 1 is a pair of stationary nut cracking elements 30. The stationary nut cracking elements are in alinement with the nut cracking elements 26 carried by the compensating members 25, and each of said stationary nut cracking elements is provided with a depression in the outer end thereof in which a portion of a nut which is being cracked may be seated. The nut cracking elements 26 are provided with like depressions and hence the nuts will be properly gripped between the opposed cracking elements.

Pivotally secured to each of the stationary nut cracking elements 30 is a nut supporting member 31. The nut supporting members 31 are each pivotally supported at one end thereof, and said members are each channel-shaped in cross-section (Fig. 1), so that the lower portions of the associated nut cracking elements 26 and 30 will be surrounded by said nut supporting member. Extended downwardly from each of the nut supporting members 31 is a member 32 which is secured to the nut supporting member in any suitable manner, said member 32 having a bifurcated lower end portion. 33 designates connectors, each of which is pivotally connected at an end thereof to the bifurcated portion of one of the members 32. The opposite ends of the respective connectors 33 are loosely connected to approximately L-shaped elements 34 which are secured to the connecting arms 21 and extend downwardly therefrom. Each nut supporting member is connected by a connector to the connecting arm of the same nut cracking unit of which said nut supporting member forms a part. The loose connections between the connectors 33 and the L-shaped members 34 are effected by extending said connectors through vertically elongated openings in said L-shaped members and arranging collars 35 on said connectors at opposite sides of the portions of the associated L-shaped members which contain said elongated openings. In view of this arrangement, movement of the connecting arms will cause the L-shaped members fixed thereto to contact with one or the other collar on the connector associated with said connecting arm, whereby said connector will be moved in one or the opposite direction to adjust the position of the associated nut supporting member 31.

Arranged longitudinally of each of the carriages at a point below the same is a rod 35', said rod being supported in the openings formed in the transverse bars 6. Each rod 35 is provided at one of its ends with a non-circular head, and adjacent to said head, with an enlarged screwthreaded portion 36. The openings 7 in the bars 6 located adjacent to the left hand end of the machine in Fig. 4 are enlarged and are provided with screwthreads to receive the enlarged screwthreaded portions 36 of the rods 35', and it is obvious, therefore, that these rods will be maintained in a fixed position. The end of each rod 35' opposite to the headed end thereof is smooth and is supported in one of the relatively small openings 7 in the associated bar 6. The rods 35' are provided with screwthreaded portions at their approximate centers, and screwed on these screwthreaded portions are stop collars 37. 38 designates blocks, one of which is slidably mounted on each of the rods 35'. The upper edges of the blocks 38 are in close proximity to the lower face of the bottom walls of the respective carriages, and 39 designates expansible coil springs one of which surrounds each rod 35, the opposite ends of each of said coil springs contacting with one of the transverse bars 6 and with the block 38 mounted on the rod with which said coil spring is associated.

Referring now to Figs. 1 and 6, F designates the feeding mechanism of my improved machine, said mechanism comprising pairs of sprocket wheels 40, 41 and 42, and a pair of sprocket wheels 43 over which a traveling nut feeder formed of a pair of spaced sprocket chains 44 operates. The pair of sprocket wheels 43 are located in close proximity to a container 45 adapted to contain the nuts to be cracked, the walls of said container being provided with openings through which the sprocket chains 44 pass. The pairs of sprocket wheels 40, 41 and 42 are supported by suitable bearings fixed to the frame of the machine. As will be seen by referring to Figs. 1 and 4, the traveling nut feeder comprises a pair of chains which are spaced apart from each other in a direction in alinement with the longitudinal dimension of the machine, and said nut feeder travels transversely of the machine immediately above the point where the nut cracking elements 26 approach the stationary nut cracking elements 30. The individual sprocket chains forming the traveling nut feeder are connected together at fixed intervals by nut carriers 45' which are in the form of pockets or buckets, said nut carriers being of a size to receive each only one nut and being provided with flanges whereby said nut carriers may be secured to the sprocket chains. Interposed between each pair of nut carriers is a transverse element secured to the sprocket chains forming the traveling nut feeder, which transverse element is provided with a raised portion 46 so shaped that it is not possible for more than one nut to be carried by a single nut carrier. In the operation of the machine, a single nut will be picked up by each nut carrier as each nut carrier passes through the nut container, and if a second nut should move into place adjacent to a nut being properly carried by a single nut carrier, the curved faces of the raised portion 26 adjacent to the nut carrier will shed the second nut.

47 designates a plate which is arranged transversely of the machine immediately above the point where the nut cracking operations take place. The plate 47 is provided with a pair of apertures 48 and 48', said apertures being located immediately above the points where each nut cracking element 26 approaches the associated stationary nut cracking element 30. The transverse plate 47 is provided with spaced apart recesses 49, which provide track ways in which the individual sprocket chains forming the nut feeder travel, said recesses 49, as shown in Fig.

4, being extended from end to end of the plate 47 and being located at opposite sides of the apertures 48 and 48'. 50 designates a gate which is attached by means of a slot and pin connection 51 to a lever 52. The lever 52 is pivoted to the plate 47 at the lower face thereof at the point indicated by the reference character 53, and the end of said lever opposite to the pivoted end thereof extends outwardly beyond the plate 47, as shown in Fig. 3. The gate 50 is slidably supported so that it may reciprocate at the upper end of the aperture 48 in a manner to control passage of nuts through said aperture, the lever 52 having a coil spring 53' associated with it in such manner that said plate will normally be drawn to the left, as shown in Fig. 3, in which position the aperture 48 will be closed. The lever 52 is provided with an upturned portion 54 (Fig. 4) and an inwardly extended portion 55 at the upper end of said upturned portion, the last mentioned portion being in close proximity to the upper face of the transverse plate 47, as shown clearly in Fig. 4. Also, the sprocket chain of the traveling nut feeder which is adjacent to the upwardly and inwardly turned portions of the lever 52 is provided with lever engaging elements 57 spaced equidistant throughout the length of said sprocket chain, there being one of these lever engaging elements located opposite every second nut carrier 45, and each of said lever engaging elements being adapted to contact with the inwardly turned portion 55 of the lever as the traveling nut feeder moves relative to the transverse plate 47, whereby the gate 50 will be moved in a manner to uncover the associated aperture 48 as each second nut carrier reaches a position adjacent to the aperture 48.

Each of the nut supporting members 31 has a coil spring 31' associated with it, said coil spring being attached at its opposite ends to the frame of the machine and to one of said nut supporting members. The coil springs 31' are each so arranged that the end thereof which is attached to the nut supporting member will move to one or the other side of a line drawn through the point at which the opposite end of the coil spring is attached to the frame and the pivotal point of the nut supporting member when said nut supporting member is moved to an elevated or depressed position. Because of this arrangement, the nut supporting members will be retained both in a depressed position and in an elevated position by the coil springs 31'.

By referring to Fig. 6 of the drawings, it will be noted that the nut container 45 is provided with a throat portion 45' through which the endless feeder F passes as it moves into said container. The throat portion 45' is of such length with respect to the distance between a pair of nut carriers on the endless feeder that there is always one of said nut carriers within said throat portion, and, therefore, the presence of one of said nut carriers within the throat portion will prevent escape of nuts from said container through the throat portion.

In the operation of my improved nut cracking machine, the nut carriers on the endless feeder F, to which motion is imparted preferably by the drive shaft 19 through beveled gears 65, 66 and shaft 67 on which shaft the pair of sprocket wheels 42 is mounted, will be drawn through the container 45 which contains nuts, and each nut carrier on the endless feeder F will pick up one nut during its passage through the nut container, additional nuts being prevented from being carried by the nut carriers by the raised portions 46 located between pairs of nut carriers. The sprocket chains comprising the endless feeder F are spaced apart a slight distance greater than the length of the longest nut which the machine will handle. Also, the distance between any one of the nut carriers on the endless feeder and the next adjacent transversely arranged member 46 will be such that any nut which is being handled by the machine may pass through the space between any one of the nut carriers and the next adjacent member 46.

To prevent the nuts from falling between the sprocket chains before said nuts reach the proper points, I arrange an inclined plate 60 within the nut carrier 45. This plate is provided with a pair of spaced channels through which the sprocket chains forming the endless feeder pass, and because the chains are located within the channels referred to, the inner portions of the nut carriers will move along the plate in contact with the top face thereof whereby the nuts will be prevented from passing through the space between the sprocket chains. I also provide a plate 61 between the nut carrier 45 and the adjacent side of the machine so that nuts will be prevented from passing between the sprocket chains as said nuts are traveling through the space between the nut container and the machine (Fig. 6).

The nuts being picked up by the nut carriers as they pass through the nut container will be carried to the plate 47 along which they will be moved by the endless feeder F. Eventually, the nuts will reach the portion of the plate 47 which is provided with apertures 48 and 48' leading to the points where the cracking operations take place, and as every second nut reaches the aperture 48, the gate 50 slidably associated therewith will be in a closed position, and therefore, that particular nut will pass over the closed aperture and will drop into the aperture 48' which is unobstructed by a gate. As the nut carrier in which the next succeeding nut to the one which has passed over the gate 50 approaches the aperture 48, one of the lever operating members 57 which is located adjacent to the nut carrier in which the second nut is carried will engage the inwardly-turned portion 55 of the lever 52, and said lever will be moved against the action of the coil spring 53' to move the gate 50 to an open position with respect to the aperture 48, whereby the second nut may pass into said aperture 48 and fall between the opposed nut cracking elements located below said gate. It will be seen from this that the gate 50 is operated for alternate nuts, said gate being closed during the passage of every second nut and open so that the aperture 48 may receive the other nuts.

As each nut drops into either the aperture 48 or the aperture 48', the associated carriage 50 will move forwardly and the recessed outer end of the nut cracking element 26 associated with the compensating member 25 will contact with the nut and move said nut to a position where it will be gripped between said nut cracking element 26 and the associated stationary nut cracking element 30. When the nut has been gripped between the nut cracking elements as described, movement of the nut cracking element 26 and the associated compensating member will be prevented by the nut, but the carriage 10 will continue to be moved by the crank shaft and the relative movement between the carriage and the compensating member will cause the pinion 29 to be rotated, said rotary movement of said pinion being caused by the pinion being moved along the rack 27 associated with the compensating member which at this time is held stationary by the nut.

The movement of the carriage with respect to the compensating member will continue until the plate 13 fixed to said carriage at the lower face of the bottom wall thereof contacts with the associated block 38 and because the coil spring 39 acting against said block is of much greater strength than the coil spring 17 connecting the connecting member 14 to the carriage 10, the movement of said carriage will be arrested and the coil spring 17 will be compressed, thereby permitting the connecting member 14 to move relative to the carriage which is held stationary. Independent movement of the connecting member 14 with respect to the carriage will continue until the inclined face 16' associated with said connecting member contacts with the peripheral face of the pinion 29, and when this contact occurs, rotation of the pinion will be prevented, and, therefore, the connecting member, the pinion and the compensating member will be locked together. Also, at this time, the end portions of the pin 21' connecting the connecting member 14 to the connecting arm 21 will have moved forwardly through the enlarged opening 22 in the side walls of the carriage 10 until said end portions of said pin contact with the forward portion of the wall of said enlarged opening, and, therefore, any additional movement of the connecting arm 21 will cause the carriage 10, together with the compensating member, the pinion and the connecting member, to move forwardly in the direction toward the associated stationary nut cracking element 30. The elements are brought to a locked position as described just before the crank on the drive shaft which is associated with the particular nut cracking unit under consideration reaches its maximum forward position, and, therefore, the final forward movement of the crank will cause the locked elements to be moved forward as a unit, whereby the shell of the nut will be cracked between the nut cracking elements 26 and 30.

It is plain that a nut of any size within certain limits may be cracked by my improved machine, and it is likewise obvious that each nut, regardless of its size, will receive exactly the same amount of cracking pressure for the reason that the movable nut cracking element 26 will move exactly the same distance during each nut cracking operation. This is made possible by the presence of the compensating member 25 which will be moved to bring the nut cracking element 26 associated therewith into contact with the nut so that said nut is gripped between said nut cracking element and the associated stationary nut cracking element. Movement of the carriage 10 then continues without affecting the compensating member, and as the coil spring 28 is not of sufficient strength to crack the shell of the nut, the compensating member will be held stationary by the nut. It is plain, therefore, that when the relatively large nut is being cracked, there will be a greater amount of relative movement between the carriage and the compensating member, as movement of the compensating member will be arrested sooner than when the smaller nut is being cracked. However, in every case, regardless of the size of the nut, the actual cracking of the shell of the nut does not take place until the movement of the carriage has been arrested by the block 38 and the inclined face 16' of the connecting member 16 contacts with the periphery of the pinion 29. After this contact has been made, the various elements are locked together as already described, and the final movement in a forwardly direction of the crank associated with the drive shaft will impart to the entire locked nut cracking unit just enough movement to cause the nut cracking element 26 to crack the shell of the nut, this final movement being exerted against the coil spring 39.

At the time a nut passes through one of the apertures 48 or 48', the associated nut supporting member 31 is in approximately horizontal position, so that it will receive the nut and position same between the opposed nut cracking elements located adjacent to said nut supporting member. However, the machine is so timed that as soon as said nut is gripped between the opposed nut cracking elements, the associated nut supporting member will be moved downwardly so that it will not, in any manner, interfere with the cracking of the shell of the nut, this downward movement of the nut supporting members being automatically effected by the connectors 33.

I will, of course, provide a suitable receptacle below the machine to receive the cracked nuts, and the depressed nut supporting members will act as guide-ways for conveying the cracked nuts from the points at which the cracking action takes place to said receptacle.

If it is desired to vary the nut cracking stroke of the machine, this may be accomplished by adjusting the stop collars 37 longitudinally of the screwthreaded portions of the rods 35' on which said stop collars are mounted. By adjusting said collars 37, the blocks 38 will be adjusted longitudinally of the rod 35' as the springs 39 will force said blocks against the stop collars and will, therefore, cause the blocks to move longitudinally of the rods with said collars. When the stop collars are adjusted longitudinally of the rods as suggested, the movement of the carriages 10 will be arrested sooner or later as the case may be, and hence the locking of the elements will take place sooner or later so as to provide a shorter or longer cracking stroke.

In the operation of the machine, I have, at times, described the operation of only one of the nut cracking units, but it is to be understood that both of the nut cracking units illustrated in the drawings operate in exactly the same manner. Also, while I have shown a machine provided with two nut cracking units, it is to be understood that machines may be produced which include only one nut cracking unit, or, if desired, machines may be produced which include more than two nut cracking units.

I claim:

1. A nut cracking machine comprising a frame, a carriage adapted for reciprocatory movement with respect to said frame, a compensating member carried by said carriage and capable of independent movement with respect thereto, a nut cracking element associated with said compensating member, a stationary nut cracking element toward which the first mentioned nut cracking element is movable, and means whereby independent movement of said compensating member with respect to said carriage may be prevented, said means comprising a rotary element arranged in engagement with said compensating member, whereby rotary movement is imparted thereto when said compensating member is moved relative to said carriage, and means arranged to engage said rotary element whereby rotation of said rotary member may be prevented.

2. A nut cracking machine comprising a frame, a carriage adapted for reciprocatory movement with respect to said frame, a compensating member carried by said carriage and capable of independent movement with respect thereto, a nut cracking element associated with said compensating member, a stationary nut cracking element toward which the first mentioned nut cracking element is movable, and means whereby independent movement of said compensating member with respect to said carriage may be prevented, said means comprising a rotary element arranged in engagement with said compensating member, whereby rotary movement is imparted thereto when said compensating member is moved relative to said carriage, and means provided with an inclined face adapted to contact with said rotary member whereby rotation of said rotary member may be prevented.

3. A nut cracking machine comprising a frame, a carriage adapted for reciprocatory movement with respect to said frame, a compensating member carried by said carriage and capable of independent movement with respect thereto and having a rack associated therewith, a nut cracking element associated with said compensating member, a stationary nut cracking element toward which the first mentioned nut cracking element is movable, and means whereby independent movement of said compensating member with respect to said carriage may be prevented, the last mentioned means comprising a pinion arranged in mesh with the rack associated with said compensating member and supported for rotary movement by said carriage whereby movement of said compensating member with respect to said carriage will impart rotary motion to said pinion, and means comprising a member provided with an inclined face adapted to be moved into contact with said pinion, whereby rotary motion thereof may be prevented.

4. A nut cracking machine comprising a frame, a carriage adapted for reciprocatory movement with respect to said frame, a compensating member carried by said carriage, a flexible connector between said carriage and said compensating member whereby said compensating member is capable of independent movement with respect to said carriage, said compensating member having a rack associated therewith and being provided with a nut cracking element, a stationary nut cracking element toward which the first mentioned nut cracking element is movable, and means whereby independent movement of said compensating member with respect to said carriage may be prevented, the last mentioned means comprising a pinion arranged in mesh with the rack associated with said compensating member and supported for rotary motion by said carriage, whereby movement of said compensating member with respect to said carriage will impart rotary motion to said pinion, and means comprising a member having an inclined face adapted to be moved into contact with said pinion whereby rotary motion thereof may be prevented, the last mentioned member being supported by said carriage and being connected thereto by a flexible connector whereby said member is capable of independent movement with respect to said carriage.

5. A nut cracking machine comprising a frame, a shaft supported by said frame and having a crank, a carriage adapted for reciprocatory movement with respect to said frame, a compensating member carried by said carriage, a flexible connector between said carriage and said compensating member whereby said compensating member is capable of independent movement with respect to said carriage, said compensating member having a rack associated therewith and being provided with a nut cracking element, a stationary nut cracking element toward which the first mentioned nut cracking element is movable, means whereby independent movement of said compensating member with respect to said carriage may be prevented, the last mentioned means comprising a pinion arranged in mesh with the rack associated with said compensating member and supported for rotary motion by said carriage, whereby movement of said compensating member with respect to said carriage will impart rotary motion to said pinion, means comprising a member having an inclined face adapted to be moved into contact with said pinion whereby rotary motion thereof may be prevented, the last mentioned member being supported by said carriage and being connected thereto by a flexible connector, whereby said member is capable of independent movement with respect to said carriage, and a connecting arm whereby the last mentioned member is operatively connected to the crank associated with said shaft.

6. A nut cracking machine comprising a frame, a shaft supported by said frame and having a crank associated therewith, a carriage adapted for reciprocatory movement with respect to said frame, a compensating member carried by said carriage and provided with a nut cracking element, a connecting arm connecting said carriage to the crank associated with said shaft, a stationary nut cracking element toward which the first mentioned nut cracking element is movable, a nut supporting member pivotally supported at the point where the first mentioned nut cracking element is caused to approach said stationary nut cracking element, and means connecting said pivoted nut supporting member and said connecting arm together, whereby said nut supporting member is raised and lowered as said connecting arm is operated by the crank of the shaft.

7. A nut cracking machine comprising a frame, a shaft supported by said frame and having a crank associated therewith, a carriage adapted for reciprocatory movement with respect to said frame, a compensating member carried by said carriage and provided with a nut cracking element, a connecting arm connecting said carriage to the crank associated with said shaft, a stationary nut cracking element toward which the first mentioned nut cracking element is movable, a nut supporting member pivotally supported at the point where the first mentioned nut cracking element is caused to approach said stationary nut cracking element, and means comprising an arm pivoted to said nut supporting member and attached to said connecting arm, whereby said nut supporting member is raised and lowered as said connecting arm is operated by the crank of the shaft.

8. A nut cracking machine comprising a frame, a carriage adapted for reciprocatory movement with respect to said frame, a compensating member carried by said carriage and capable of independent movement with respect thereto, a nut cracking element associated with said compensating member, a stationary nut cracking element toward which the first mentioned nut cracking element is movable, means whereby independent movement of said compensating member with respect to said carriage may be prevented, and an endless nut feeder comprising a pair of spaced sprocket chains to and between which a plurality of nut carriers are fixed in spaced relationship, said endless feeder being arranged to pass in close proximity to the point at which the nut cracking operations take place and being adapted to directly deposit the nuts between the ends of the opposed nut cracking elements.

9. A nut cracking machine comprising a frame, a plurality of carriages adapted for reciprocatory movement with respect to said frame, a compensating member carried by each of said carriages and capable of independent movement with respect thereto, a nut cracking element associated with each of said compensating members, a stationary nut cracking element associated with each of the first mentioned nut cracking elements and arranged in longitudinal alinement therewith, said nut cracking elements associated with said compensating members being movable toward said stationary nut cracking elements, means whereby independent movement of said compensating members with respect to the respective carriages is prevented, an endless nut feeder comprising a pair of spaced sprocket chains to and between which a plurality of nut carriers are fixed in spaced relationship, a plate fixed to said frame immediately above the points at which the nut cracking elements associated with the compensating members approach the stationary nut cracking elements, said plate being provided with a pair of apertures arranged in vertical alinement with the points at which the nut cracking operations take place and said endless feeder being supported by said plate in a manner to cause nuts carried thereby to be deposited in said apertures whereby said nuts are introduced between the opposed nut cracking elements, a gate associated with one of said apertures in a manner to control the passage of nuts therethrough, and means on said endless feeder whereby said gate may be intermittently moved.

10. A nut cracking machine comprising a frame, a plurality of carriages adapted for reciprocatory movement with respect to said frame, a compensating member carried by each of said carriages and capable of independent movement with respect thereto, a nut cracking element associated with each of said compensating members, a stationary nut cracking element associated with each of the first mentioned nut cracking elements and arranged in longitudinal alinement therewith, said nut cracking elements associated with said compensating members being movable toward said stationary nut cracking elements, means whereby independent movement of said compensating members with respect to the respective carriages is prevented, an endless nut feeder comprising a pair of spaced sprocket chains to and between which a plurality of nut carriers are fixed in spaced relationship, a plate fixed to said frame immediately above the points at which the nut cracking elements associated with the compensating members approach the stationary nut cracking elements, said plate being provided with a pair of apertures arranged in vertical alinement with the points at which the nut cracking operations take place and said endless feeder being supported by said plate in a manner to cause nuts carried thereby to be deposited in said apertures whereby said nuts are introduced between the opposed nut cracking elements, a slidably movable gate arranged to normally close one of said apertures so as to prevent passage of nuts therethrough, and means carried by said endless feeder whereby said gate may be moved to an open position with respect to the associated aperture at the approach of every second nut carrier.

11. A nut cracking machine comprising a frame, a carriage supported for reciprocatory movement with respect to said frame, a compensating member carried by said carriage and capable of independent movement with respect thereto, a nut cracking element associated with said compensating member, a stationary nut cracking element toward which the first mentioned nut cracking element is movable, a stop member fixed to said carriage, a member against which said stop member abuts to temporarily arrest movement of said carriage, and means whereby independent movement of said compensating member with respect to said carriage may be prevented.

12. A nut cracking machine comprising a frame, a carriage adapted for reciprocatory movement with respect to said frame, a compensating member carried by said carriage and capable of independent movement with respect thereto, a nut cracking element associated with said compensating member, a stationary nut cracking element toward which the first mentioned nut cracking element is movable, a stop member fixed to said carriage, an adjustable member against which said stop member abuts to temporarily arrest movement of said carriage, and means whereby independent movement of said compensating member with respect to said carriage may be prevented.

13. A nut cracking machine comprising a frame, a carriage adapted for reciprocatory movement with respect to said frame, a compensating member carried by said carriage and capable of independent movement with respect thereto, a nut cracking element associated with said compensating member, a stationary nut cracking element toward which the first mentioned nut cracking element is movable, stop member fixed to said carriage, an adjustable spring-pressed member against which said stop member abuts to temporarily arrest movement of said carriage, and means whereby independent movement of said compensating member with respect to said carriage may be prevented.

14. A nut cracking machine comprising a frame, a carriage adapted for reciprocatory movement with respect to said frame, a compensating member carried by said carriage and capable of independent movement with respect thereto, a nut cracking element associated with said compensating member, a second nut cracking element toward which the first mentioned nut cracking element is movable, and means whereby independent movement of said compensating member with respect to said carriage may be prevented, said means comprising a rotary element arranged in engagement with said compensating member whereby rotary movement is imparted thereto when said compensating member is moved relative to said carriage, and means carried by said carriage and arranged to engage said rotary element whereby rotation of said rotary element may be prevented.

In testimony whereof I have hereunto set my hand.

LEO J. MEYER.